US009744538B2

(12) United States Patent
Anderson (10) Patent No.: US 9,744,538 B2
(45) Date of Patent: Aug. 29, 2017

(54) LOADING APPARATUS FOR DUST COLLECTION CONTAINERS

(71) Applicant: Robert Charles Anderson, Daleville, VA (US)

(72) Inventor: Robert Charles Anderson, Daleville, VA (US)

(73) Assignee: Robert C. Anderson, Daleville, VA (US)

( * ) Notice: Subject to any disclaimer, the term of this patent is extended or adjusted under 35 U.S.C. 154(b) by 168 days.

(21) Appl. No.: 14/860,751

(22) Filed: Sep. 22, 2015

(65) Prior Publication Data

US 2016/0088990 A1   Mar. 31, 2016

Related U.S. Application Data

(60) Provisional application No. 62/056,557, filed on Sep. 28, 2014.

(51) Int. Cl.
| | |
|---|---|
| *B01D 53/00* | (2006.01) |
| *B04C 5/185* | (2006.01) |
| *B01D 45/16* | (2006.01) |
| *B01D 45/08* | (2006.01) |
| *A47L 9/16* | (2006.01) |

(52) U.S. Cl.
CPC .............. *B04C 5/185* (2013.01); *B01D 45/08* (2013.01); *B01D 45/16* (2013.01); *A47L 9/165* (2013.01); *A47L 9/1666* (2013.01); *A47L 9/1683* (2013.01)

(58) Field of Classification Search
CPC ........ B04C 5/185; A47L 9/1683; A47L 9/165; A47L 9/1666; B01D 45/16; B01D 45/08
See application file for complete search history.

(56) References Cited

U.S. PATENT DOCUMENTS

| | | | | | |
|---|---|---|---|---|---|
| 2,622,696 | A | * | 12/1952 | Pegg ...................... | A61C 19/00 55/349 |
| 3,097,673 | A | * | 7/1963 | Hunt ........................ | A47L 5/38 141/272 |
| 3,771,294 | A | * | 11/1973 | Ronning ................ | B65G 53/60 55/345 |
| 3,901,799 | A | * | 8/1975 | Adkison ................... | B04C 3/00 209/139.2 |
| 4,133,658 | A | * | 1/1979 | Callewyn ............... | B01D 45/12 15/314 |
| 4,367,665 | A | * | 1/1983 | Terpstra ............... | B23D 59/006 83/100 |

(Continued)

*Primary Examiner* — Dung H Bui (57) ABSTRACT

A loading apparatus lowers or raises a dust or particulate collection container for ease of extraction and installation. This apparatus is disposed within a rigid frame structure capable of mounting to a wall or mobile device. A U-shaped member supports the dust collection container, the container typically being a cylindrical bucket or container with integral rim or handles. The U-shaped member orthogonally translates up into a first position and down into a second position with activation of a lever. The mechanics of the apparatus effects linear vertical travel of the dust collection container and when in a first position, mates the rim of the container onto a compliant gasket member disposed within the rigid frame structure, thus forming a vacuum-tight interface necessary for vacuum systems, in particular but not limited to, dust collection vacuum systems that utilize a cyclone dust separator.

1 Claim, 5 Drawing Sheets (56) References Cited

U.S. PATENT DOCUMENTS

| | | | | |
|---|---|---|---|---|
| 7,118,468 | B2 * | 10/2006 | Robichaud | B24B 55/10 |
| | | | | 125/13.01 |
| 7,325,750 | B2 * | 2/2008 | Shutic | B01D 45/14 |
| | | | | 118/309 |
| 7,559,268 | B2 * | 7/2009 | Sasaki | B23D 59/006 |
| | | | | 83/100 |
| 7,662,199 | B2 * | 2/2010 | Wellens | A47L 11/4013 |
| | | | | 15/340.3 |
| 8,048,184 | B1 * | 11/2011 | Evanson | B01D 45/08 |
| | | | | 55/434 |
| 8,147,580 | B2 * | 4/2012 | Lin | B03C 3/017 |
| | | | | 220/200 |
| 8,377,160 | B2 * | 2/2013 | Witter | B01D 46/0093 |
| | | | | 55/322 |
| 8,657,933 | B2 * | 2/2014 | Jancik | B04C 5/08 |
| | | | | 118/326 |
| 8,695,158 | B2 * | 4/2014 | Cheng | B01D 46/42 |
| | | | | 15/323 |
| 8,882,892 | B2 * | 11/2014 | Hoversten | B04C 5/08 |
| | | | | 55/356 |

* cited by examiner

LOADING APPARATUS FOR DUST COLLECTION CONTAINERS

CROSS REFERENCE TO RELATED APPLICATIONS

This invention claims priority under 35 U.S.C. 119(e) of Provisional Patent Application 62/056,557 filed Sep. 28, 2014. The disclosure therein is incorporated here by reference.

BACKGROUND OF THE INVENTION

1. Field of the Invention

The present invention relates generally to dust collection systems. This invention is directed to devices and systems that require a sealed dust collection container that is capable of rapid removal and installation for the purpose of emptying the container. The invention is more particularly concerned with dust collection systems that incorporate the use of a cyclonic separator.

2. Description of the Prior Art

A cyclone dust collector system is well known to the industry. The principle of operation is detailed in U.S. Pat. No. 8,695,158 and others. The cyclone system efficiently diverts dust derived from a vacuum collection system into a collection container or bucket coaxially located to the cyclone and thereby relieves the vacuum source of dust build-up and filter impregnation. The cyclone system is widely adopted in the woodworking industry as well as other dust intensive environments.

In prior art, U.S. Pat. No. 6,833,016 describes a cyclonic dust separating device that mounts directly to a lid on the collection container or bucket requiring the operator to dismember the lid and the attached cyclone, a cumbersome operation aggravated by various hoses attached to the cyclone. In another form, U.S. Pat. No. 8,377,160 describes a cyclonic separator attached to a lid that can be uncoupled by three or four quick-release clamps; however, this requires a specialized lid and container that is expensive and highly engineered. U.S. Pat. No. 8,695,158 describes a specialized lever mechanism that lifts and lowers a large metallic barrel that incorporates a specialized fixed bracket on said metallic barrel rendering the device useful only for this unique application.

U.S. Pat. No. 3,097,673 describes a hinged U-shaped loading device with integral handle that raises and lowers a dust collection vessel for a stationary vacuum device; however, this mechanism is hinged and offers little mechanical advantage to overcome excessive weights of fully loaded containers. Furthermore, the hinged device causes the vessel to contact the gasket member in a progressive, or wiping, manner that may cause the gasket to become unevenly loaded and/or displaced.

Accordingly, there is a clear need in the art for an improved means of loading industry standard containers and buckets in a precise, orthogonal manner onto a sealed rim with minimal effort expended of the operator.

BRIEF SUMMARY OF THE INVENTION

It is an object of this invention to provide an interfacing structure and mechanism to expedite the loading and emptying of a dust collection container or bucket for dust collection systems and avoids the drawbacks of the prior art as mentioned above.

A primary object of the present invention is to provide a means of loading and extracting dust-collecting containers for the purpose of emptying said containers with minimal effort required of the user.

It is another particular object to use industry standard containers and buckets, particularly industry standard buckets or trash containers with integral rim or handles and thus avoid highly engineered and costly containers described in prior art. Additionally, industry standard buckets and containers are inherently easier to handle and to empty.

It is a further object of the present invention to accurately locate and seat the dust collecting bucket or container through mechanical guides and features, and to seat said dust collecting bucket or container onto a gasket bearing surface to achieve a vacuum-tight interface with minimal effort required of the operator.

Another object is to provide a unitized, rugged structure on which a commercially available cyclonic dust separator is mounted and in turn, provide a firm foundation for the mounting of the cyclonic dust separator and its associated hoses. In addition, the unitized structure can be mounted to a wall or a wheeled mobile device or cart.

Yet another object is a simple and compact design that can be easily altered in size to accommodate various dust separating cyclones and collection containers.

A key object is a lever mechanism that achieves mechanical advantage for raising and lowering heavily loaded dust collection buckets or containers with minimal force. The lever mechanism provides a controlled descent of the loaded container such that a heavily loaded container does not significantly influence the force applied to the lever mechanism. The mechanism incorporates mechanical stops that limit the travel of the slide device and prevents over-compressing the gasket seal and achieving a positive stop for the lever mechanism during an unloading operation.

A final objective is the loading apparatus accommodate alternative methods of activating the loading mechanism such as electric drives, pneumatic pistons, acme-threaded screws and other mechanical advantage devices.

Accordingly, in order to achieve the aforesaid objectives, an apparatus is presented that is composed of a rigid structure, a U-shaped plate that accepts dust collection containers, the U-shaped member (or plate) constrained to move only up and down in a vertical direction, a lever mechanism that actuates sliders whereby movement of the sliders produces vertical motion of the U-shaped member, and suspension brackets that connect the U-shaped member to the sliders.

The rigid structure is comprised of a planar stationary platform, two side plates and a rear plate. These components are secured with a plurality of fasteners and collectively form the rigid structure. A first circular opening is disposed on the stationary platform to accept the stream of dust and particulate matter derived from a cyclonic separation system. The stationary platform disposes a first surface for mounting of cyclonic separator devices and a second surface on which an annular compliant gasket is disposed, coaxial to first circular opening, the annular gasket availing a vacuum-tight seal for dust collection containers while in a first, or loaded, position.

A movable U-shaped member, substantially parallel to the stationary platform, is provided to accept preferentially round dust collection containers. The U-shaped member's radius is coaxial to the first circular opening of the stationary platform by means of two laterally disposed suspension brackets, the suspension brackets being substantially centered about the centerline of the radius of U-shaped member.

Integral protrusions of the suspension brackets slide within slots of the side plates and constrain movement of the U-shaped member to up and down movement while guiding the U-shaped member substantially coaxial to a first circular opening of the stationary platform. The sliders are disposed on the first surface of the stationary platform and are linked to the lever mechanism. Movement of the lever mechanism effects linear travel of the sliders. The sliders feature oblong ramp-shaped slots that communicate with integral protrusions of the suspension brackets. Thus, moving the lever mechanism causes the integral protrusions of the suspension bracket to follow the ramped-shaped slots of the sliders culminating in up and down movement of the U-shaped member.

The angle, or ramp, of the oblong slots of the sliders present a mechanical advantage when activating the lever mechanism such that operator forces required to lift a heavily loaded dust collection container are substantially less than the load of the container. Finally, the oblong, ramp-shaped slots of the sliders limit the travel of the lever mechanism and effect a positive stop for the lever.

When the present invention is deployed with the U-shaped member in the first position, the dust collection container is raised and forms a vacuum-tight seal with the annular gasket and collects all dust, debris, and particulate matter directed from the cyclonic separator. When deployed in the second position, the U-shaped member is lowered, enabling an intuitive and convenient means to load or extract the dust collection container.

An advantage of the present invention is that components are contained within a compact, symmetrical apparatus that is simple to manufacture and is scalable to accommodate various sizes of cyclonic separators and dust collection containers. A further advantage is the apparatus described herein mounts the cyclonic separator to the stationary platform with fasteners and therefore accomplishes a rigid means for securing peripheral devices that connect to the cyclonic separator such as dust collecting vacuum hoses. A final advantage is the ease and rapidity one can install or extract dust collection containers.

The above and other features and advantages of the invention will become apparent from the ensuing description of the preferred embodiment(s), as discussed with references to the appended figures of Drawings.

DETAILED DESCRIPTION OF THE INVENTIONS

Embodiments of the present invention will now be described by way of example only, with reference to the accompanying drawings.

The present invention relates to a loading apparatus 100 for dust collection containers intended for a cyclonic dust separator system.

Figure 1:
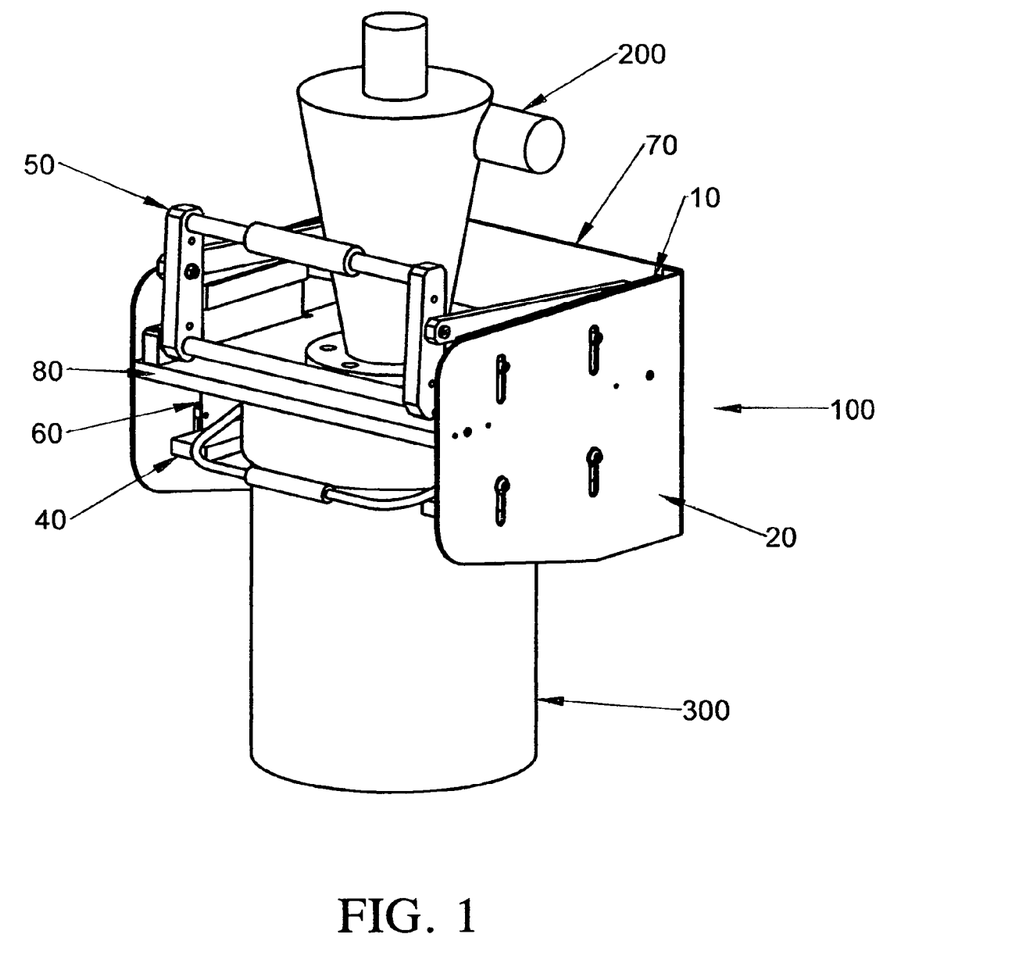
FIG. 1 is a perspective illustration of an overall dust separator system according to a preferred embodiment of the present invention.
Figure 2:
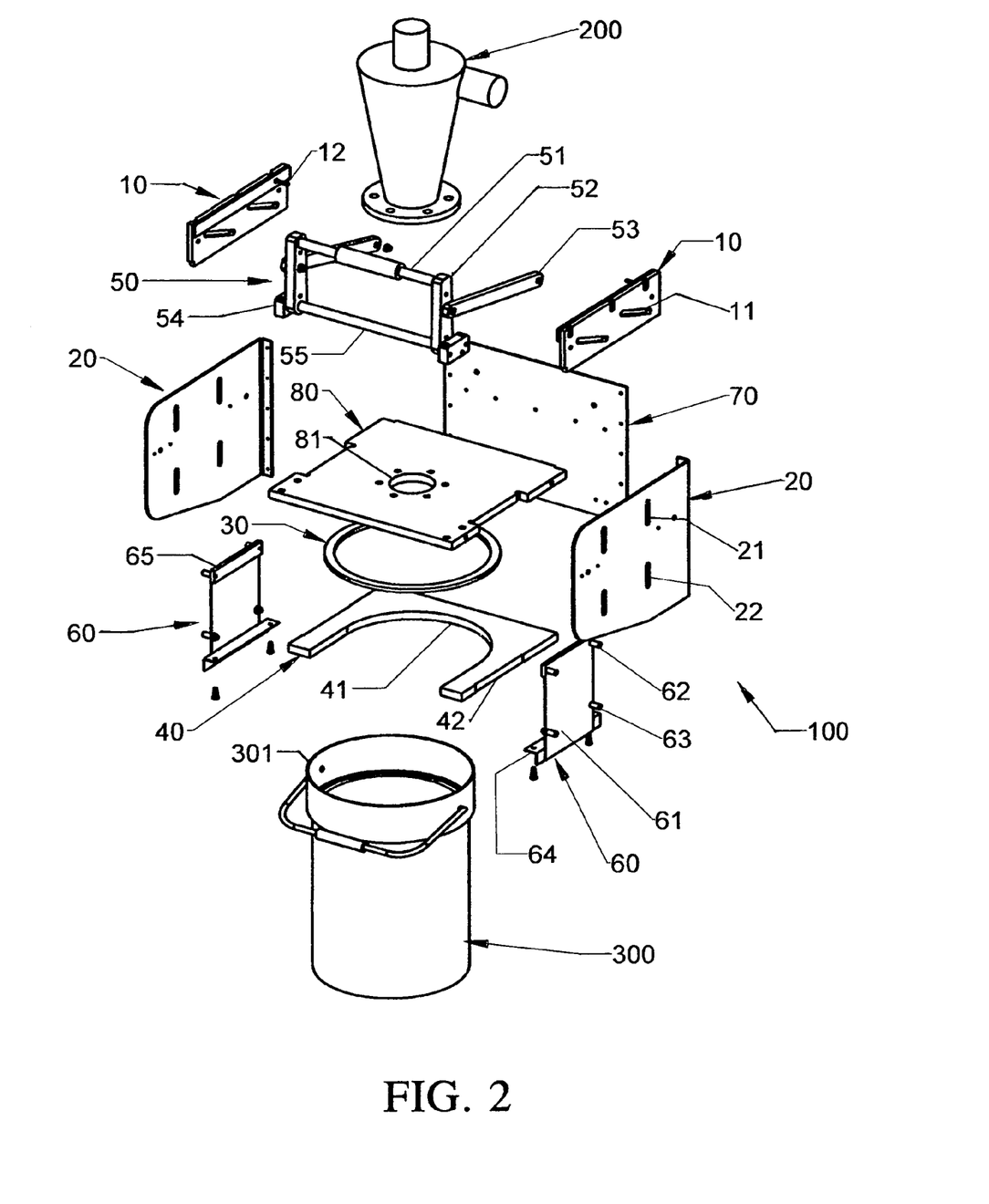
FIG. 2 is a perspective exploded view depicting all parts comprising a preferred embodiment of the present invention.

Referring to FIG. 1 and FIG. 2, there is shown a loading apparatus according to a first embodiment of the present invention. The loading apparatus 100 is composed of a stationary platform 80, rear plate 70, two side plates 20, two suspension brackets 60, two sliders 10, a lever mechanism 50, an annular gasket 30, and a U-shaped member 40.

The structure consists of a planar stationary platform 80, a laterally disposed rear plate 70 and two laterally disposed side plates 20, the rear plate 70 and side plates 20 permanently attached with a plurality of fasteners to the stationary platform 80. Collectively, this forms a rigid, unitized structure that is vital to the operation of this embodiment. The unified structure is capable of mounting to a walled surface, mounting to a support structure projecting from a portable wheeled cart, or other external mounting means. The stationary platform 80 disposes a first surface for mounting of cyclonic devices 200 and a second surface containing an annular compressible gasket 30.

The cyclonic separator 200, a commercially available item, is rigidly mounted and sealed to the first surface of stationary platform 80, coaxial to a first circular opening 81. In operation, the cyclonic separator 200 produces a vortex of dust and particulate matter that is directed through first circular opening 81. The dust collection container 300, typically an industry standard round bucket or similar container, receives the stream of dust and particulate matter for storage and eventual disposal. The round dust collection container 300 aligns with radius 41 of the U-shaped member 40 and becomes coaxial to the annular gasket 30 as described below.

A resilient annular gasket 30 is disposed on the second surface of stationary platform 80 and coaxial to first circular opening 81. The dust collection container 300 is disposed of a rim 301 that mates with annular gasket 30 when the dust collection container 300 is in a first position.

A lever mechanism 50 is attached to a first surface of stationary platform 80 through pillow blocks 54 with a plurality of fasteners. The lever mechanism 50 communicates with sliders 10 by means of link 53. Actuation of handle 51 effects linear travel of sliders 10 along a first surface of stationary platform 80. The sliders 10 are disposed with sloped, oblong slots 11 that communicate with the suspension bracket 60, as further described below.

Figure 3:
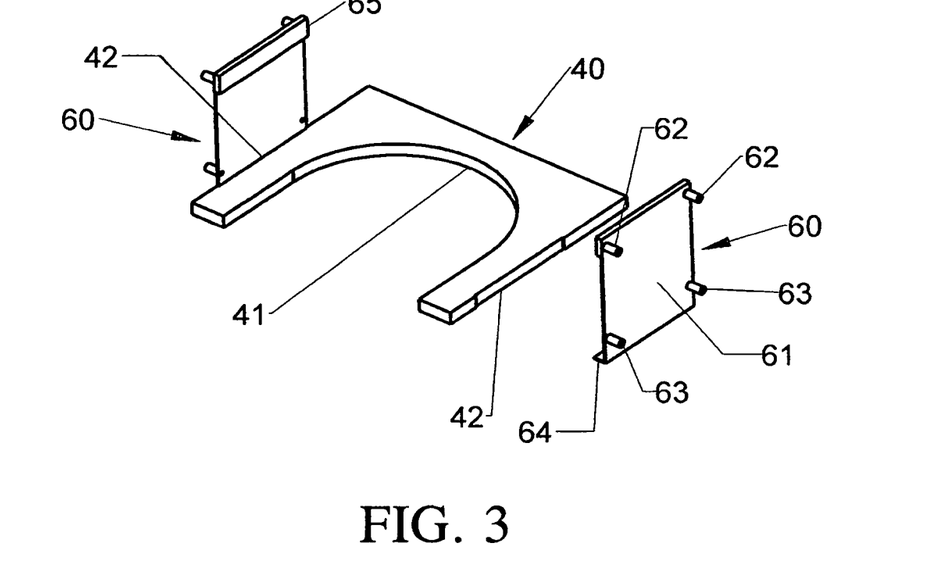
FIG. 3 is a partial exploded perspective view of a U plate with laterally disposed suspension brackets installed.

FIG. 3 is a partial view that shows two suspension brackets 60 laterally disposed about the U-shaped member 40. A pair of laterally disposed notches 42, substantially centered about axis of radius 41, are provided and accurately locate the suspension brackets 60 about centerline of radius 41. A perpendicular portion 64 of the suspension bracket 60 is affixed to a second surface of U-shaped member 40 with a plurality of mechanical fasteners and/or adhesives. The resultant accurate placement of the suspension brackets 60 onto U-shaped member 40 is advantageous to maintaining coaxial alignment of U-shaped radius 41 with respect to first circular opening 81 of FIG. 2. Two upper protrusions 62 and two lower protrusions 63 project from a first surface 61 of the suspension bracket 60. These protrusions are structurally secured or integral to first surface 61 and are preferentially of a low friction material. The upper and lower protrusions, 62 and 63 respectively, are not limited to a cylindrical shape as minor improvements that improve function are within the spirit and scope of the present invention. A backing plate 65 is structurally secured or integral to a second surface of suspension plate 60 to strengthen the upper protrusions 62 as the upper protrusions 62 bear the load of the dust collecting container. Although the suspension bracket 60 is described as a collection of various parts structurally integrated, it is foreseeable to cast or injection mold significant portions of suspension bracket 60 to improve cost and function.

Figure 4:
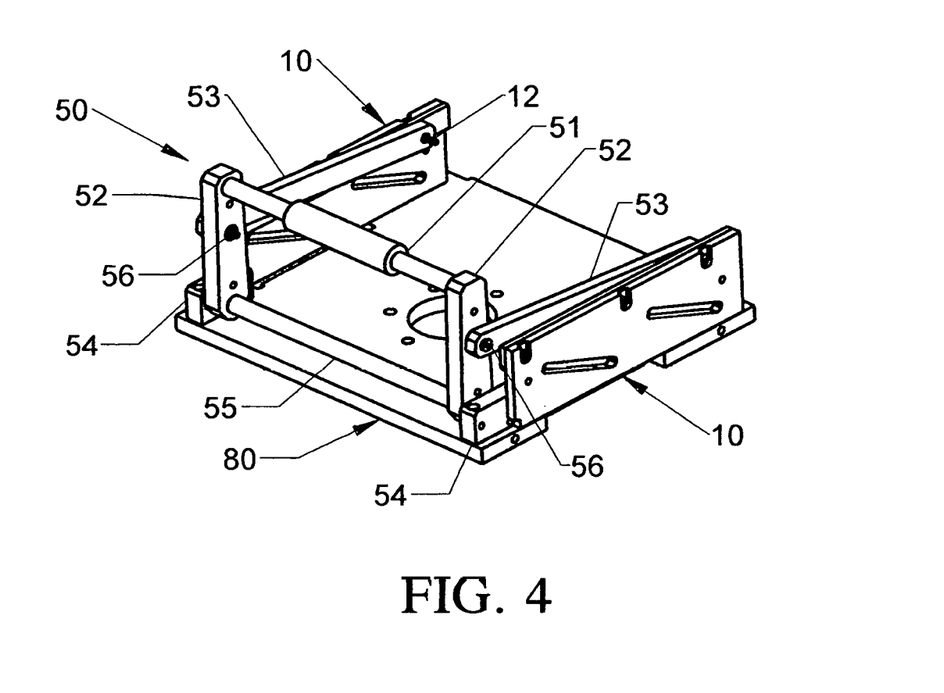
FIG. 4 is a partial perspective view of the lever mechanism and the means by which the lever mechanism communicates with the sliders.

FIG. 4 is a partial view of the lever mechanism 50, sliders 10 and stationary platform 80. The lever mechanism 50 is composed of a handle 51, a pair of laterally opposed lever bars 52, a pair of laterally opposed links 53, a pair of laterally opposed pillow blocks 54, and an axle 55. The links 53 are pivotally connected on a distal end to a protruding stud 12, said protruding stud 12 rigidly affixed to slider 10, and pivotally connected on a proximal end with a cylindrical fastener 56 that forms a rotatable junction between link 53 and lever bar 52. The pillow blocks 54 are rigidly fastened to a first surface of stationary platform 80. The axle 55 is fixed on both ends within pillow blocks 54. The lever bar 52 rotates about axle 55 and propels the links 53 when the operator pushes/pulls on handle 51 which, in turn, causes travel of the sliders 10 along first surface of stationary platform 80.

Figure 5:
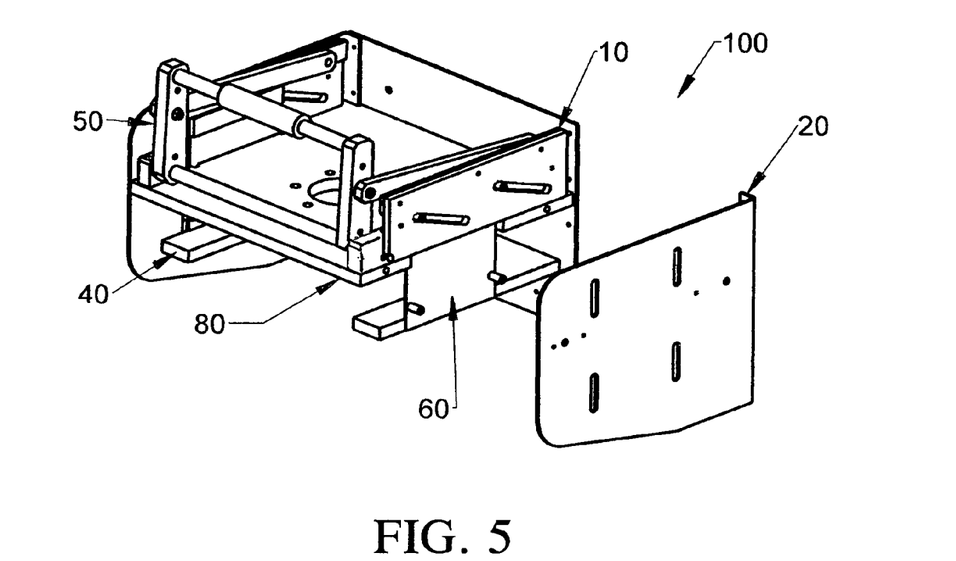
FIG. 5 is a partial exploded perspective view showing the relationship of suspension plate cylindrical protrusions to the slides and vertical slots of the side plate in a first position.
Figure 6:
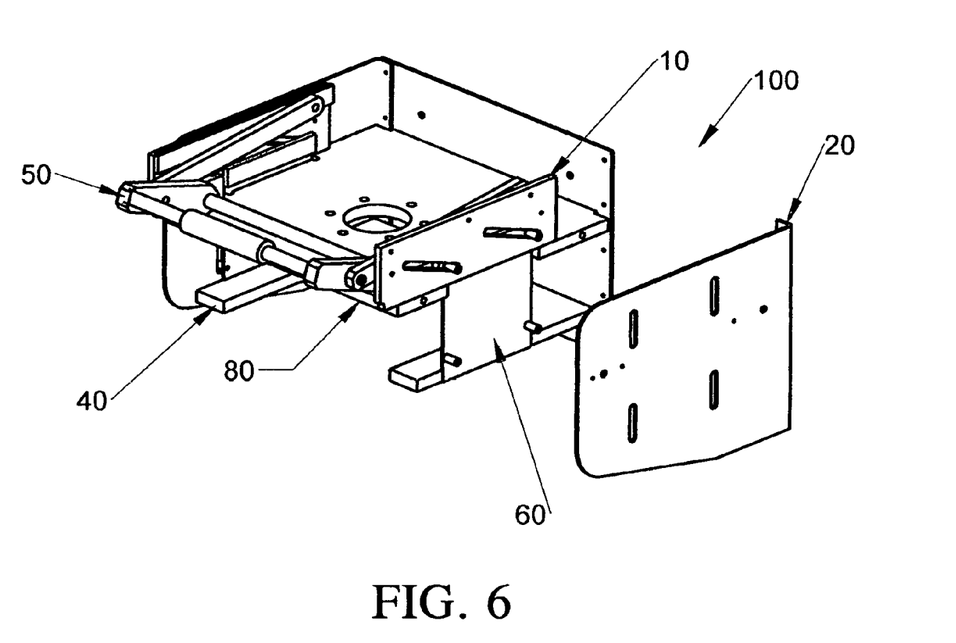
FIG. 6 is a partial exploded perspective view showing the relationship of suspension plate cylindrical protrusions to the slides and vertical slots of the side plate in a second position.

FIG. 5 and FIG. 6 are partial exploded views of the loading apparatus 100 that illustrates the movement of the sliders 10 in a first position and second position of lever mechanism 50. The sliders 10 are in constant and low friction contact with a first surface of stationary platform 80. When the lever mechanism 50 is in a first position as shown in FIG. 5, the sliders 10 are stationed to the rear of loading apparatus 100. Moving the lever mechanism 50 to a second position shown in FIG. 6 advances the sliders 10 towards the front of loading apparatus 100. The U-shaped member 40 is elevated in the first position of lever mechanism 50 as shown in FIG. 5 and fully lowered in a second position of lever mechanism 50 as shown in FIG. 6.

Figure 7:
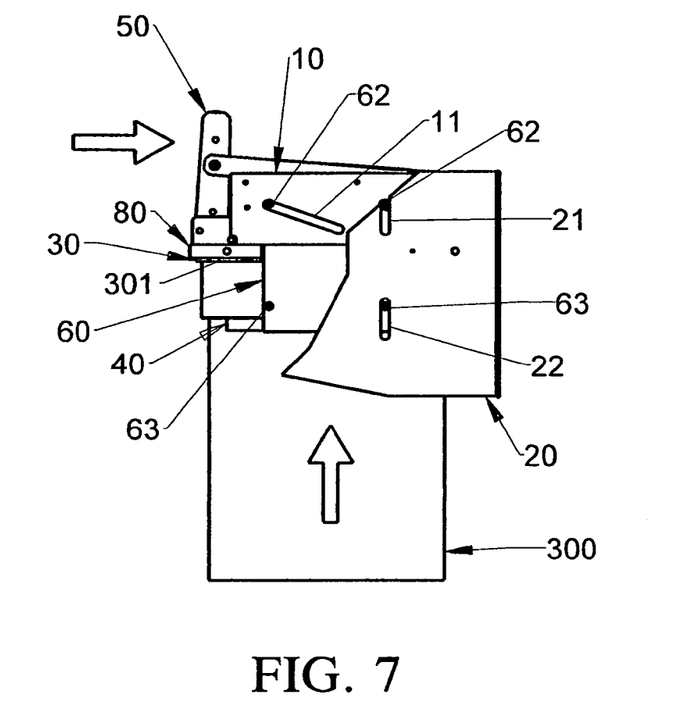
FIG. 7 is a partial elevation view showing the dust collection bucket in a first position.
Figure 8:
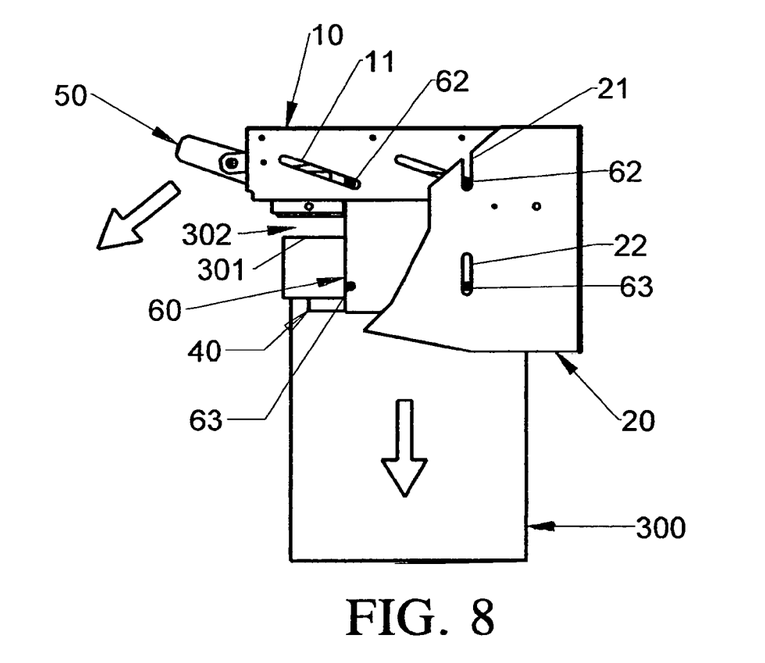
FIG. 8 is a partial elevation view showing the dust collection bucket in a second position.

FIG. 7 and FIG. 8 are partial elevation views that illustrate the movement of dust collection container 300 in a first and second position respectively. Referring to FIG. 7, the lever mechanism 50 is in a first position. Upper protrusions 62 of suspension bracket 60 simultaneously engage within the ramp-shaped slots 11 of slider 10 and the upper vertical slots 21 of side plate 20. Lower protrusions 63 engage the lower vertical slots 22 of side plate 20. Protrusions 62 and 63, engaged within slots 21 and 22 respectively of side plate 20, constrain movement of suspension bracket 60 to vertical direction only. Thus, suspension bracket 60, being firmly secured to a second surface of U-shaped member 40 as discussed in FIG. 3, constrains movement of U-shaped member 40 to vertical direction only while maintaining substantial parallelism between a first surface of U-shaped member 40 and a second surface of stationary platform 80. In this first position, upper protrusions 62 are elevated within oblong ramped slots 11 of slider 10 and elevated within vertical slot 21 of side plate 20; suspension bracket 60 is in a fully raised position thereby positioning U-shaped member 40 to a fully raised position; rim 301 of dust collection container 300 is fully mated and substantially parallel with annular gasket 30.

FIG. 8 illustrates the dust collection container in a fully lowered, or second position. Lever mechanism 50, in a second position, locates slider 10 in a forward position causing upper protrusions 62 to descend down the ramped slots of slider 10, thereby moving suspension bracket 60 downward and effecting movement of U-shaped member 40 into a second position. In this second position, dust collection container 300 is fully lowered creating a gap 302 of sufficient clearance for the user to remove dust collection container 300. Sliders 10 are limited in their extent of travel due to upper protrusions 62 reaching an endpoint of oblong slot 11 while reacting within upper slots 21 of side plate 20. In turn, lever mechanism 50 is halted, presenting a positive stop for the operator while moving lever mechanism 50 to its second position.

While the invention has been described in detail with what is presently considered to be the most practical and preferred embodiment, it is to be understood that the invention in not to be limited to the specific disclosed embodiments, and that many modifications and variations would present themselves to persons skilled in the art without departing from the spirit and scope of the invention, as defined in the appended claims.

The invention claimed is:

1. A loading apparatus for dust collection container that interface with cyclonic separator produces a first and second position of the dust collection container for the purpose of quickly loading or unloading said dust collection container, the loading apparatus comprising: a cyclonic separator for separating dust from a vacuum collection source and a dust collection container for receiving separated dust; a rigid structure consisting of a stationary platform, a rear plate laterally disposed and perpendicular to the stationary platform, two side plates laterally disposed and perpendicular to the stationary platform; the rear plate is rigidly attached to the stationary platform, the rear plate providing a mounting surface of the apparatus; two laterally disposed side plates rigidly attached to the stationary platform, the side plates disposing vertical slots that constrain movement of the dust collection container in a vertical direction; the stationary platform disposing a first circular opening through which dust and particulate matter is directed, the stationary platform disposing a first surface for mounting of cyclonic separator, the stationary platform member disposing a second surface accepting an annular compliant gasket coaxial to the first circular opening, a U-shaped plate substantially parallel to the stationary platform, the U-shaped plate possessing a semi-circular feature substantially coaxial with first circular opening of the stationary platform; two sliders movably disposed on first surface of the stationary platform, the sliders possessing oblong ramp-shaped slots that communicate with the suspension brackets, the sliders communicate with a lever mechanism to produce travel of the sliders; two suspension brackets laterally disposed on the sides of U-shaped plate that support and guide the U-shaped plate, each suspension bracket possessing a plurality of upper and lower protrusions that communicate with vertical slots of the side plates, the upper protrusions engaged with the oblong ramp-shaped slots of the sliders; wherein, movement of the sliders influences position of the upper protrusions of the suspension bracket effecting a vertical motion of the U-shaped plate into a first and second position, the first position locating rim of the dust collection container coaxial to an annular resilient gasket, the first position producing a vacuum tight seal of the dust collection container with the annular gasket, the second position permitting extraction or loading of the dust collection containers; wherein, the upper protrusions of the suspension bracket simultaneously communicate with the oblong ramp-shaped slots of the sliders and vertical slots of the side plates, said communication producing a limited movement of the lever mechanism corresponding to first and second positions of dust collection container; wherein, a lever mechanism is provided that is pivotally connected onto the first surface of the stationary platform, the lever mechanism possessing a pivotally connected link that communicates with the sliders, the lever mechanism produces movement of sliders upon actuation of lever mechanism, the lever mechanism effecting a mechanical advantage over the force required to move the sliders, the lever mechanism producing a first and second position corresponding to the first and second position of the dust collection container; and wherein the U-shaped plate contains a radius corresponding to the radius of the dust collection container and is disposed of two laterally opposed notches that locate suspension brackets along centerline of radius of the U-shaped plate.

\* \* \* \* \*